US007263236B2

(12) United States Patent
Park et al.

(10) Patent No.: US 7,263,236 B2
(45) Date of Patent: Aug. 28, 2007

(54) METHOD AND APPARATUS FOR ENCODING AND DECODING THREE-DIMENSIONAL OBJECT DATA

(75) Inventors: In-kyu Park, Seoul (KR); Shin-jun Lee, Seoul (KR); In-wook Song, Seoul (KR); Chang-su Kim, Seoul (KR); Sang-uk Lee, Seoul (KR)

(73) Assignees: Samsung Electronics Co., Ltd., Suwon-si, Gyeonggi-do (KR); Seoul National University Industry Foundation, Gwanak-gu, Seoul (KR)

( * ) Notice: Subject to any disclaimer, the term of this patent is extended or adjusted under 35 U.S.C. 154(b) by 357 days.

(21) Appl. No.: 10/727,629

(22) Filed: Dec. 5, 2003

(65) Prior Publication Data

US 2004/0150639 A1   Aug. 5, 2004

Related U.S. Application Data

(60) Provisional application No. 60/487,263, filed on Jul. 16, 2003, provisional application No. 60/430,976, filed on Dec. 5, 2002.

(30) Foreign Application Priority Data

Nov. 24, 2003   (KR) ...................... 10-2003-0083778

(51) Int. Cl.
  *G06K 9/36*   (2006.01)
  *G06K 9/46*   (2006.01)
  *G06T 17/00*  (2006.01)
(52) U.S. Cl. ...................... 382/240; 382/232; 345/420
(58) Field of Classification Search ................ 345/420; 382/232, 240
  See application file for complete search history.

(56) References Cited

U.S. PATENT DOCUMENTS 4,694,404 A * 9/1987 Meagher ...................... 345/421

(Continued)

OTHER PUBLICATIONS

Chang et al., "LDI tree: a hierarchical representation for image-based rendering", Proc. of 26th Annual Conf. on Computer Graphics and interactive Techniques, 1999, ACM Press/Addison-Wesley Publishing Co., NY, NY, pp. 291-298.*

(Continued)

*Primary Examiner*—Kee M. Tung
*Assistant Examiner*—Roberta Prendergast
(74) *Attorney, Agent, or Firm*—Buchanan Ingersoll & Rooney PC

(57) ABSTRACT

Provided are methods and apparatuses for encoding and decoding three-dimensional object data, which consists of point texture data, voxel data, or octree data. The method of encoding three-dimensional object data involves generating three-dimensional object data having a tree structure in which nodes are attached labels indicating their types; encoding nodes of the three-dimensional object data; and generating the three-dimensional object data whose nodes are encoded into a bitstream. The apparatus for encoding three-dimensional object data includes a tree structure generator which generates three-dimensional object data having a tree structure in which nodes are attached labels indicating their types; a merging order selector which merges the nodes of the three-dimensional object data by referring to their labels; a node encoder which encodes merged nodes; and a bitstream generator which generates the three-dimensional object data whose merged nodes are encoded into a bitstream. The method of decoding three-dimensional object data involves reading-continue flag information from a bitstream of encoded three-dimensional object data and decoding the continue flag information; decoding note type information of the bitstream; decoding an 'S' node if the note type information indicates that a current node is an 'S' node and decoding a PPM node if the note type information indicates that the current node is a PPM node; and restoring the three-dimensional object data whose nodes are encoded to a tree structure. The apparatus for decoding three-dimensional object data includes a bitstream reader which receives a bitstream of encoded three-dimensional object data; a node decoder which decodes the bitstream; and a tree structure restorer which restores decoded nodes to a tree structure.

32 Claims, 14 Drawing Sheets

PARENT-CHILDREN RELATIONSHIP

ORIGINAL MODEL AND ITS CORRESPONDING TREE

APPROXIMATED MODEL AND MERGED TREE

APPROXIMATED MODEL AND MERGED TREE

U.S. PATENT DOCUMENTS

| | | | | |
|---|---|---|---|---|
| 5,123,084 | A | * | 6/1992 | Prevost et al. ............... 345/420 |
| 5,999,187 | A | * | 12/1999 | Dehmlow et al. .......... 345/420 |
| 6,396,492 | B1 | * | 5/2002 | Frisken et al. .............. 345/420 |
| 6,429,864 | B1 | * | 8/2002 | Schwarzer .................. 345/419 |
| 6,518,963 | B1 | * | 2/2003 | Waupotitsch et al. ....... 345/419 |
| 6,529,192 | B1 | * | 3/2003 | Waupotitsch ............... 345/419 |
| 6,535,642 | B1 | * | 3/2003 | De Bonet .................... 382/232 |
| 6,563,499 | B1 | * | 5/2003 | Waupotitsch et al. ....... 345/420 |
| 6,603,484 | B1 | * | 8/2003 | Frisken et al. .............. 345/622 |
| 6,914,601 | B2 | * | 7/2005 | Fujiwara et al. ............ 345/424 |
| 6,999,073 | B1 | * | 2/2006 | Zwern et al. ............... 345/420 |

OTHER PUBLICATIONS

Moffat, A., "Two-level context based compression of binary images", Data Compression Conference, 1991, DCC '91, Apr. 8-11, 1991, pp. 382-391.*

Jiangang Duan et al., "Compression of the Layered Depth Image", Proceedings of Data Compression Conference, IEEE Computer Society Press, 2001, pp. 331-340.*

Rambally et al., "Octrees and their applications in image processing", Proceedings of IEEE Southeastcon '90, Apr. 1990, pp. 1116-1120, vol. 3.*

Shkarin, D., "PPM: one step to practicality", Proceedings of Data Compression Conference, DCC 2002, Apr. 2002, pp. 202-211.*

Sherwood, T. and Calder, B., "Automated design of finite state machine predictors for customized processors", Proc. of 28th Annual international Symposium on Computer Architecture, 2001, ISCA '01. ACM Press, NY, NY, pp. 86-97.*

Forchhammer, S.; Salinas, J.M., "Progressive coding of palette images and digital maps", Proceedings of Data Compression Conference, DCC 2002, Apr. 2002, pp. 362-371.*

Moffat, A., Neal, R. M., and Witten, I. H., "Arithmetic coding revisited", ACM Trans. Inf. Syst. vol. 16, Issue 3, Jul. 1998, pp. 256-294.*

Jiangang Duan et al., "Compression of the Layered Depth Image", IEEE Transaction on Image Processing, 2003, pp. 365-372, vol. 12, No. 3.

Marcelo J. Weinberger et al., The LOCO-I Lossless Image Compression algorithm: Principles and Standardization into JPEG-LS, IEEE Transactions on Image Processing, 2000, pp. 1309-1324, vol. 9, No. 8.

Chang-Su Kim et al., "Compact Encoding of 3D Voxel Surfaces Based on Pattern Code Representation", IEEE Transactions on Image Processing, 2002, pp. 932-943, vol. 11, No. 8.

I. Moccagatta et al., "MPEG-e Video Verification Model Version 13.0", International Organisation for Standardisation , ISO/JTC1/SC29/WG11, Coding of Moving Pictures and Associated Audio Information, 1999, pp. 362, MPEG99/N2687, Seoul, Korea.

Mikael Vourges-Sevenier (Mindego) et al., "FDIS of ISO/IEC 14496 Part 16: Animation Framework eXtension (AFX)", International Organisation for Standardisation, ISO?IEC JTC1/SC29/WG11, 2002, pp. 1-182, ISO/IEC JTC1/SC29/WG11 N5397, Awaji.

Paul G. Howard et al., "Arithmetic Coding for Data Compression", Proceedings of the IEEE, 1994, pp. 857-865, vol. 82, No. 6.

Alexander Zhirkov et al.,, "Result of Core Experiment on Depth Image-Based Representation (AFXA8.3)", International Organisation for Standardisation, Coding of Moving Pictures and Audio, ISO/IECJTC1/SC29/WG11, MPEG2002/M8259, 2002, pp. 1-10, Fairfax, Virginia, USA.

Khalid Sayood, "Introduction to Data Compression", 2nd Edition, 2000, pp. 1-179, Academic Press.

Y. Bayakovski et al., "Depth Image-Based Representations for Static And animated 3D Objects", IEEE ICIP, 2002, pp. 25-28, vol. 3, Rochester, New York, USA.

Mikael Bourges-Sevenier (Mindego) et al., FPDAM Of ISO/IEC 14496-1/AMD4, International Organisation for Standardisation, Coding of Moving Pictures and audio, ISO/IEC JTC1/SC29/WG11, N5071, 2002, pp. 1-367, Klagenfurt, Germany.

European Search Report for corresponding Application No. 03257599.5.

Y. Bayakovski et al., "Depth Image-Based Representations and Compression for Static and Animated 3D Objects", Laboratory of Computer Graphics at Dep of CS MSU, 2002, pp. 1-27.

Y. Bayakovski et al., "Depth Image-Based Representations for Static and Animated 3D Objects", Proceedings International Conference on Image Processing, ICIP 2002, pp. 25-28, vol. 2, No. 3. IEEE, New York, NY, USA.

Hanan Samet et al., "Octree Approximation and Compression Methods", Proceedings of First International Symposium on 3D Data Processing Visualization and Transmission, Padova, Italy, 2002, pp. 1-10, IEEE Computer Society.

John G. Cleary et al., "Data Compression Using Adaptive Coding and Partial String Matching", IEEE Transactions on Communications, 1984, pp. 396-402, vol. COM-32, No. 4, IEEE Inc., New York, USA.

Alexander Zhirkov, "Binary Volumetric Octree Representation for Image-Based Rendering", Proc. Of Graphicon'01, 2001, pp. 1-2, Retrieved from the Internet.

Chinese Office Action dated Dec. 13, 2005 with English-language translation.

Tong Cao et al., "Quick Encoding Compression Algorithm of Octree for Modeling Three Dimensional GIS", Journal of Image and Graphics, vol. 7(A), No. 1, January 2002, pp. 50-54.

* cited by examiner

PointTexture {
    field   SFInt32   width          512
    field   SFInt32   height        512
    field   MFInt32   depth         [ ]
    field   MFColor   color         [ ]
    field   SFInt32   depthNbBits  8
} to be compressed

PARENT-CHILDREN RELATIONSHIP

ORIGINAL MODEL AND ITS CORRESPONDING TREE

APPROXIMATED MODEL AND MERGED TREE

APPROXIMATED MODEL AND MERGED TREE

FIG. 4
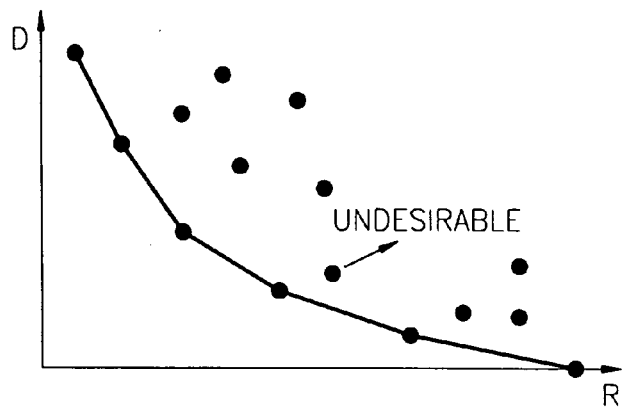
FIG. 5
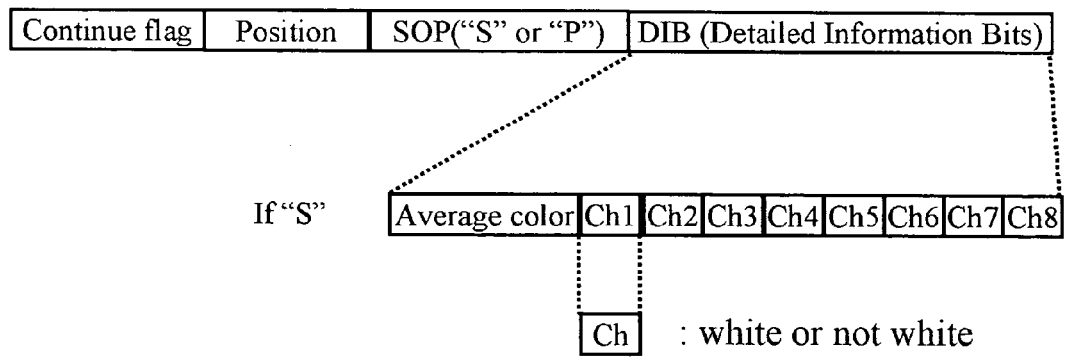
FIG. 6
FIG. 7
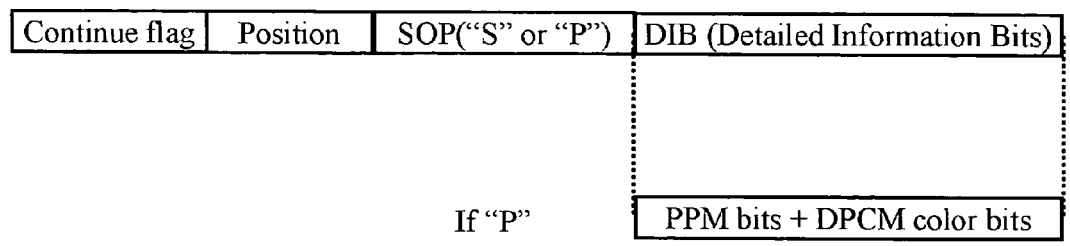

DEPTH=k-1

DEPTH=k

FIG. 9
(a)~(e) resolution: 256x256x256   (f)~(h) resolution: 512x512x512
 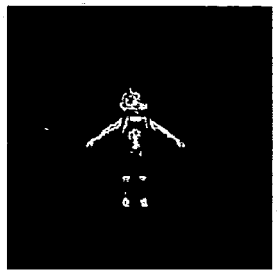  
(a) angel  (b) avatar  (c) dog  (d) plane
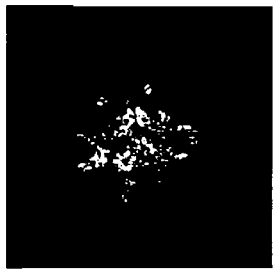   
(e) flower  (f) white star  (g) fighter  (h) robots

FIG. 10A

PRESENT INVENTION COMPARED WITH ORIGINAL BINARY DATA

|  | DEPTH | | | COLOR | | | TOTAL | | |
|---|---|---|---|---|---|---|---|---|---|
|  | P | O | R | P | O | R | P | O | R |
| Angel | 34,893 | 306,218 | 0.11 | 238,748 | 722,046 | 0.33 | 273,641 | 1,028,264 | 0.27 |
| Avatar | 6,396 | 87,184 | 0.07 | 35,813 | 64,944 | 0.55 | 42,209 | 152,128 | 0.28 |
| Dog | 11,501 | 111,262 | 0.10 | 64,312 | 137,178 | 0.47 | 75,813 | 248,440 | 0.31 |
| Plane | 5,254 | 96,946 | 0.05 | 51,256 | 94,230 | 0.54 | 56,510 | 191,176 | 0.30 |
| Flower | 17,804 | 98,469 | 0.18 | 65,016 | 98,799 | 0.66 | 82,820 | 197,268 | 0.42 |
| WhiteStar | 75,937 | 1,061,676 | 0.07 | 441,442 | 806,082 | 0.55 | 517,379 | 1,867,758 | 0.28 |
| Fighter | 38,108 | 906,308 | 0.04 | 275,853 | 573,030 | 0.48 | 313,961 | 1,479,338 | 0.21 |
| Robots | 105,458 | 1,285,188 | 0.08 | 669,236 | 1,141,350 | 0.59 | 774,694 | 2,426,538 | 0.32 |

FIG. 10B

PRESENT INVENTION COMPARED WITH A COMMERCIAL TOOL (WinZip)

|  | DEPTH | | | COLOR | | | TOTAL | | |
|---|---|---|---|---|---|---|---|---|---|
|  | P | W | R | P | W | R | P | W | R |
| Angel | 34,893 | 150,853 | 0.23 | 238,748 | 402,118 | 0.59 | 273,641 | 552,971 | 0.49 |
| Avatar | 6,396 | 14,407 | 0.44 | 35,813 | 46,475 | 0.77 | 42,209 | 60,882 | 0.69 |
| Dog | 11,501 | 34,256 | 0.34 | 64,312 | 112,734 | 0.57 | 75,813 | 146,990 | 0.52 |
| Plane | 5,254 | 9,771 | 0.54 | 51,256 | 47,245 | 1.08 | 56,510 | 57,016 | 0.99 |
| Flower | 17,804 | 30,243 | 0.59 | 65,016 | 80,721 | 0.81 | 82,820 | 110,964 | 0.75 |
| WhiteStar | 75,937 | 250,174 | 0.30 | 441,442 | 725,630 | 0.61 | 517,379 | 975,804 | 0.53 |
| Fighter | 38,108 | 173,124 | 0.22 | 275,853 | 414,241 | 0.67 | 313,961 | 587,365 | 0.53 |
| Robots | 105,458 | 330,815 | 0.32 | 669,236 | 939,136 | 0.71 | 774,694 | 1,269,951 | 0.61 |

METHOD AND APPARATUS FOR ENCODING AND DECODING THREE-DIMENSIONAL OBJECT DATA

This application claims the priority of U.S. Patent Application Nos. 60/487,263 and 60/430,976, filed on Dec. 5, 2002 and Jul. 16, 2003, respectively, in the U.S. Patent & Trademark Office and Korean Patent Application No. 03-83778, filed on Nov. 24, 2003, in the Korean Intellectual Property Office, the disclosures of which are incorporated herein in their entirety by reference.

BACKGROUND OF THE INVENTION

1. Field of the Invention

The present invention relates to a method and apparatus for encoding and decoding data, and more particularly, to a method and apparatus for encoding and decoding three-dimensional object data comprised of one of point texture data, voxel data, and octree data.

2. Description of the Related Art

One of the most fundamental goals of research on three-dimensional graphics has always been to generate as much realistic graphic screens as real images. Accordingly, research has been carried out on rendering technology using a polygonal model, and as a result, a variety of modeling and rendering techniques, capable of representing a very realistic three-dimensional environment, have been developed. However, strenuous efforts and a considerable amount of time are always required to establish complicated three-dimensional graphic models. In addition, a considerable amount of data is needed for representing a very realistic and sophisticated environment, which may end up in very low data storage and transmission efficiencies.

Currently, a polygonal model is generally adopted to represent three-dimensional objects in computer graphics. In this technique, an arbitrary shape can be roughly represented by a set of colorful polygons, for example, a set of triangles. Recent remarkable developments in software algorithms and graphic hardware have enabled a complicated object or scene to be visualized into a very realistic, still (or moving) polygonal model in real time.

For the past few years, research has been vigorously carried out on a technique of representing a three-dimensional object mostly because of difficulty in constructing polygonal models for a variety of objects in a real world, complexity of conventional rendering techniques, and limits in representing images as realistically as possible.

An application program needs a considerable number of polygons to represent three-dimensional objects. For example, a model for representing the human body in detail needs several millions of triangles, which is too many to deal with. Even though recent developments in three-dimensional measurement technology, such as three-dimensional scanning, make it possible to obtain sophisticated three-dimensional data whose errors are within an allowable bound, it is still very difficult and very expensive to obtain a polygonal model that perfectly matches with objects. In addition, a rendering algorithm for providing as realistic image representations as photographs is too complicated to support real-time rendering.

In the meantime, there is a relatively new method of representing or rendering an object having a complex geometrical structure, i.e., depth image-based representation (DIBR), which has been adopted in MPEG-4 Animation Framework extension (AFX). While polygonal meshes are generally used to represent objects in computer graphics, a set of reference images that cover a visible surface of a three-dimensional object is used to represent the three-dimensional object in DIBR. Each of the reference images is represented by a depth map, and the depth map presents an array of different distances between pixels on an image plane and the surface of the three-dimensional object. One of the biggest advantages of DIBR is that objects can be represented with high quality by simply using reference images without using polygonal models. In addition, the complexity of rendering a DIBR view is determined solely depending on the number of pixels constituting the DIBR view (i.e., the resolution of the DIBR view), irrespective of the complexity of a scene. DIBR includes SimpleTexture, PointTexture, and OctreeImage. PointTexture represents an object with PointTexture pixels seen from a predetermined camera position. Each of the PointTexture pixels is represented by its color and depth (a distance between each of the PointTexture pixels and the predetermined camera position) and other properties that help PointTexture rendering. A plurality of pixels may possibly be provided along lines of sight. A PointTexture image is generally comprised of a plurality of layers. FIG. 1 illustrates a simple example of a one-dimensional PointTexture image. PointTecture requires a considerable amount of data to realistically represent objects. In general, the more realistic images, the higher sampling density and the more data needed to be processed. Therefore, efficient compression of PointTexture images is strongly required. FIG. 2 illustrates node specifications of PointTexture. In FIG. 2, 'depth' and 'color' fields are the ones to be compressed.

Until now, research has not much been carried out on PointTexture, and thus there are only few conventional PointTexture-based methods. One of the conventional PointTexture-based methods is a layered depth image (LDI) compression method which has been disclosed by Dual and Li in "Compression of the Layered Depth Image", IEEE Trans. Image Processing, Vol. 12, No. 3, pp. 365~372, March 2003.

In the prior art, JPEG-LS algorithms have been adopted to compress-depth information. On the other hand, color information is compressed using existing coding standards. However, such JPEG-LS algorithms do not support progressive data compression and progressive data transmission.

In the meantime, a method of compressing a three-dimensional voxel surface model using pattern code representation (PCR) has been disclosed by C. S. Kim and S. U. Lee in "Compact Encoding of 3D Voxel Surface Based on Pattern Code Representation, IEEE Trans. Image Processing, Vol. 11, No. 8, PP. 932~943, 2002. However, this method does not use a hierarchical octree structure and cannot facilitate progressive compression schemes. In addition, an octree-based data compression method [ISO/IEC JTC1/SC29/WG11 14496-16: 2003, Information Technology-Coding of Audio-Visual Objects—Part 16: Animation Framework extension] has been developed for MPEG 4 AFX. However, this method, like the above-mentioned conventional methods, cannot provide progressive bit-streams.

SUMMARY OF THE INVENTION

The present invention provides a method and apparatus for encoding and decoding three-dimensional object data comprised of point texture data, voxel data, and octree data, which can compress depth image information while guaranteeing more effective estimation encoding, higher data encoding efficiency, and more effective data lossly compression.

According to an aspect of the present invention, there is provided a method of encoding three-dimensional object data, which is comprised of point texture data, voxel data, or octree structure data. The method involves generating three-dimensional object data having a tree structure in which nodes are attached labels indicating their types; encoding nodes of the three-dimensional object data; and generating the three-dimensional object data whose nodes are encoded into a bitstream.

Preferably, in generating the three-dimensional object data, voxels are differentiated from one another by converting the three-dimensional object data into voxel data using three-dimensional bounding volume and differently labeling the voxels depending on whether or not they are located at places where objects exist.

Preferably, in the tree structure representing the three-dimensional object data, a node having sub-nodes is labeled 'S', a node whose voxels do not contain objects is labeled 'W', a node whose voxels all contain objects is labeled 'B', and a node whose voxels are encoded using a prediction-by-partial-matching (PPM) algorithm is labeled 'P'.

Preferably, encoding the nodes of the three-dimensional object data involves encoding node information which indicates whether or not a current node is an 'S' node or a 'P' node; and encoding detailed information bit (DIB) data of an 'S' node if the node information indicates that the current node is an 'S' node and encoding DIB data of a 'P' node if the node information indicates that the current node is a 'P' node.

According to another aspect of the present invention, there is provided a method of encoding three-dimensional object data, which is comprised of point texture data, voxel data, or octree structure data. The method involves (a) generating three-dimensional object data having a tree structure in which nodes are attached labels indicating their types; (b) merging the nodes of the three-dimensional object data by referring to their labels; (c) encoding merged nodes; (d) generating the three-dimensional object data whose merged nodes are encoded into a bitstream; and (e) repeatedly carrying out steps (a) through (d) until an uppermost node of the tree structure representing the three-dimensional object data is encoded.

Preferably, in step (a), a node having sub-nodes is labeled 'S', a node whose voxels do not contain objects is labeled 'W', a node whose voxels all contain objects is labeled 'B', and a node whose voxels are encoded using a PPM algorithm is labeled 'P'.

Preferably, step (b) involves selecting 'S' nodes whose sub-nodes are labeled 'W' and 'B' and 'P' nodes as candidate nodes to be merged; selecting, from among the candidate nodes as an optimal node, a node which can minimize a ratio of a difference ΔD between the number of distorted bits before merging the candidate nodes and the number of distorted bits after merging the candidate nodes with respect to a difference ΔR between the number of bits before merging the candidate bits and the number of bits after merging the candidate bits; labeling the selected node 'B'; and updating all the candidate nodes except the node-selected as an optimal node.

Preferably, ΔD is calculated in the following equation using a Hamming distance between an original model V and its approximation $\hat{V}$ as distortion measurement:

$$D = \sum_{x=1}^{X}\sum_{y=1}^{Y}\sum_{z=1}^{Z}|V(x,y,z) - \hat{V}(x,y,z)|$$

where X×Y×Z represents the resolution of the original model.

Preferably, step (c) involves encoding a continue flag which is information indicating whether or not the candidate nodes exist in a queue; encoding node position information which indicates position of each of the candidate nodes in the queue; encoding node type information which indicates whether or not a current node is an 'S' node or a 'P' node; and encoding DIB data of an 'S' node if the node information indicates that the current node is an 'S' node and encoding DIB data of a 'P' node if the node information indicates that the current-node is a 'P' node.

Preferably, encoding the DIB data of the 'S' node involves encoding an average of color information; and encoding labels of eight sub-nodes of the current node.

Preferably, encoding the DIB data of the 'P' node involves encoding depth information; and encoding the color information.

Preferably, in encoding the depth information, all nodes below a predetermined node in the tree structure representing the three-dimensional object data are PPM-encoded according to a raster scanning order.

Preferably, in encoding the color information, red (R), green (G), and blue (B) values of 'B' voxels of the current node are encoded by carrying out differential pulse code modulation (DPCM) and adaptive arithmetic coding (AAC).

According to another aspect of the present invention, there is provided an apparatus for encoding three-dimensional object data, which is comprised of point texture data, voxel data, or octree structure data. The apparatus includes a tree structure generator which generates three-dimensional object data having a tree structure in which nodes are attached labels indicating their types; a merging order selector which merges the nodes of the three-dimensional object data by referring to their labels; a node encoder which encodes merged nodes; and a bitstream generator which generates the three-dimensional object data whose merged nodes are encoded into a bitstream.

Preferably, the merging order selector includes a candidate node selector which selects 'P' nodes and 'S' nodes whose sub-nodes are labeled 'W' and 'B' as candidate nodes to be merged; an optimal node selector which selects, from among the candidate nodes as an optimal node, a node which can minimize a ratio of a difference ΔD between the number of distorted bits before merging the candidate nodes and the number of distorted bits after merging the candidate nodes with respect to a difference ΔR between the number of bits before merging the candidate bits and the number of bits after merging the candidate bits and labels the selected node 'B'; and a candidate node updater which updates all the candidate nodes except the node selected as an optimal node.

Preferably, the node encoder includes a continue flag encoder which encodes a continue flag which is information indicating whether or not a current node is the end of a compressed bitstream; a node position encoder which encodes node position information indicating position of each of the candidate nodes in the queue; a node 'S'-or-'P' (SOP) selector which encodes node type information indicating whether or not the current node is an 'S' node or a 'P' node; an S node encoder which encodes DIB data of an 'S' node if the node information indicates that the current node is an 'S' node; and a P node encoder which encodes DIB data of a 'P' node if the node information indicates that the current node is a 'P' node.

According to another aspect of the present invention, there is provided a method of decoding three-dimensional object data. The method involves reading continue flag information from a bitstream of encoded three-dimensional object data and decoding the continue flag information; decoding note type information of the bitstream; decoding an 'S' node if the note type information indicates that a current node is an 'S' node and decoding a PPM node if the note type information indicates that the current node is a PPM node; and restoring the three-dimensional object-data whose nodes are encoded to a tree structure.

According to another aspect of the present invention, there is provided a method of decoding three-dimensional object data. The method involves decoding nodes of a bitstream of encoded three-dimensional object data; and restoring the three-dimensional object data whose nodes are encoded to a tree structure.

Preferably, decoding the nodes of the bitstream of the encoded three-dimensional object data involves reading continue flag information from a bitstream of encoded three-dimensional object data and decoding the continue flag information; reading node position information indicating which candidate node in a queue is a current node and decoding the node position information; decoding note type information of the bitstream; decoding an 'S' node if the note type information indicates that a current node is an 'S' node; and decoding a PPM node if the note type information indicates that the current node is a PPM node.

Preferably, in decoding the 'S' node, an average color of eight sub-nodes of the current node is decoded as DIB data, and the eight sub-nodes are sequentially decoded into black nodes ('B' nodes) or white nodes ('W' nodes).

Preferably, in decoding the PPM node, the current node is PPM decoded using DIB data bits (DIB) data, and R, G, and B values of 'B' voxels of the current node are decoded by carrying out inverse AAC and inverse DPCM.

According to another aspect of the present invention, there is provided an apparatus for decoding a bitstream of encoded three-dimensional object data. The apparatus includes a bitstream reader which receives a bitstream of encoded three-dimensional object data; a node decoder which decodes the bitstream; and a tree structure restorer which restores decoded nodes to a tree structure.

Preferably, the node decoder includes a continue flag decoder which decodes a continue flag indicating whether or not a current node is the end of the bitstream; a node position information decoder which reads node position information indicating which candidate node in a queue is a current node and decoding the node position information; a node type selector which decodes note type information of the bitstream; an S node decoder which decodes an average color of eight sub-nodes of the current node as DIB data and then sequentially decodes the eight sub-nodes into 'B' nodes or 'W' nodes; and a P node decoder which PPM-decodes DIB data of the current node and then decodes R, G, and B values of 'B' voxels of the current node by carrying out inverse AAC and inverse DPCM decoding an 'S' node, if the note type information indicates that a current node is a PPM node.

According to another aspect of the present invention, there is provided a computer-readable recording medium on which a program enabling any of the above-mentioned methods is recorded.

BRIEF DESCRIPTION OF THE DRAWINGS

The above and other features and advantages of the present invention will become more apparent by describing in detail exemplary embodiments thereof with reference to the attached drawings in which:

FIG. 4 is a bit rate-distortion curve obtained when using a method of encoding three-dimensional object data;

FIG. 5 is a diagram illustrating a bitstream structure of a node;

FIG. 6 is a diagram illustrating a bitstream structure of an S node;

FIG. 7 is a diagram illustrating a bitstream structure of a P node;

FIG. 9 is a diagram illustrating a test model for testing the performance of the present invention;

FIGS. 10(a) and 10(b) are tables comparing the performance of the present invention compressing a point texture test model with the performance of other commercial tools (such as WinZip) compressing a PointTexture test model;

DETAILED DESCRIPTION OF THE INVENTION

Hereinafter, a method and apparatus for encoding and decoding three-dimensional object data comprised of point texture data, voxel data, and tree-structured data according to a preferred embodiment of the present invention will be described in greater detail with reference to the accompanying drawings.

Figure 11:
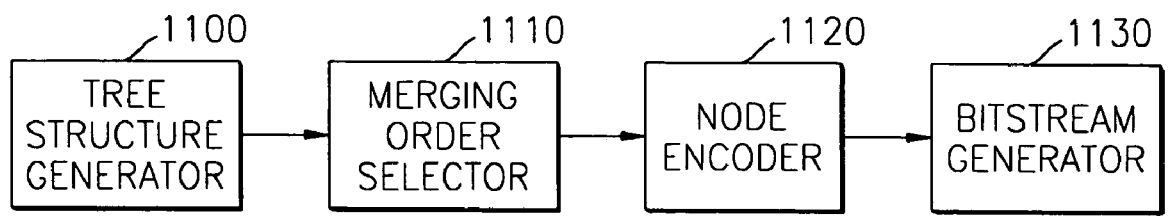
FIG. 11 is a block diagram of an apparatus for encoding three-dimensional data according to a preferred embodiment of the present invention.

FIG. 11 is a block diagram of an apparatus for encoding three-dimensional object data according to a preferred embodiment of the present invention. Referring to FIG. 11, the apparatus includes a tree structure generator 1100, a merging order selector 1110, a node encoder 1120, and a bitstream generator 1130.

The tree structure generator 1100 receives point texture data, voxel data, or tree-structured data, which represents three-dimensional object data, and generates three-dimensional object data having a tree structure in which each node is labeled to be differentiated from others. Here, the tree structure is an octree structure.

Hereinafter, a method of generating an octree will be described in greater detail. A PointTexture image is converted into volume data, and the volume data is alternately represented by an octree. Then, leaf nodes of the octree are effectively encoded by using a prediction-by-partial-matching (PPM) method. Accordingly, a method of encoding and decoding a three-dimensional object according to a preferred embodiment of the present invention is equivalent to a method of compressing a PointTexture model and an octree model.

In order to convert depth information of a three-dimensional object into volume data, bounding volume is created first. The bounding volume has the same resolution as PointTexture. For example, supposing that PointTexture represents an image with a resolution of X×Y and depth information of each pixel has a resolution of Z, bounding volume having a resolution of X×Y×Z is created. The origin of a bounding box is located at the lower left front corner of the bounding box. A right voxel has a value of x, which is larger than the value of a left voxel, an upper voxel has a value of y, which is larger than the value of a lower voxel, and a rear voxel has a value of z, which is larger than the value of a front voxel. Depth information can be immediately converted into binary volume data. All voxels of the volume data are initialized to W (white, '0'). Thereafter, the voxels of the volume data are set to B (black, '1') if there positions are referred to by pixels of the point texture. Black voxels represent dots on a three-dimensional object, and white voxels represent a transparent background.

The volume data is represented by an octree, and nodes of the octree are classified into four different categories. Labels respectively representing the four different categories are presented in Table 1 below. If bounding volume contains an object, a root node is labeled 'S', and the bounding volume is divided into eight identical sub-volumes. If a sub-volume only includes black voxels or white voxels, a corresponding node is labeled 'B' or 'W'. Otherwise, the node corresponding to the sub-volume is labeled 'S', and the sub-volume is further divided into eight identical smaller parts. This process is repeatedly carried out until it reaches a node at a predetermined depth of the octree. If a node at the predetermined depth of the octree includes black voxels as well as white voxels, the node is labeled 'P' and voxel values included in the node can be encoded by using a PPM method.

TABLE 1

| Labels | Comments |
| --- | --- |
| S | Split: Node is divided into 8 sub-nodes |
| W | White: Node is comprised of white voxels only |

TABLE 1-continued

| Labels | Comments |
| --- | --- |
| B | Fill Black: Node is completely or mostly comprised of black voxels |
| P | PPM: Voxel values in node are encoded b PPM algorithm |

Figures 1, 2:
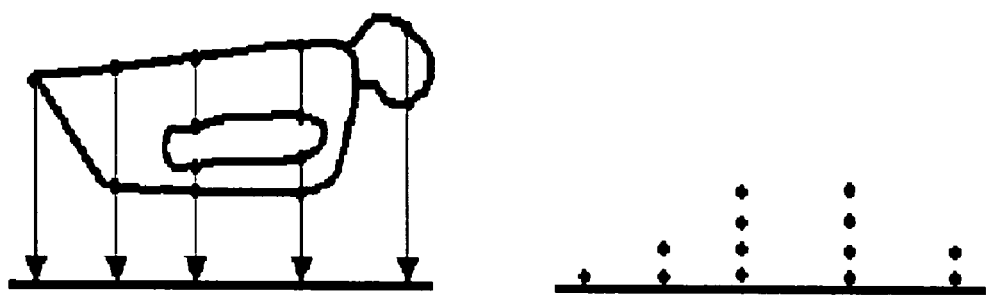
FIG. 1 is a diagram illustrating an example of point texture for a layered depth image.
FIG. 2 is a diagram showing point texture node standards.
Figure 3A:
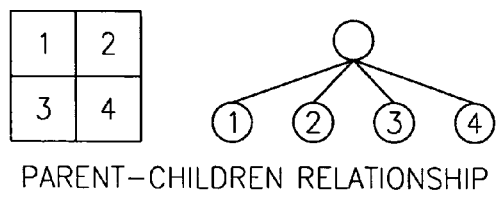
FIGS. 3(a) through 3(d) are diagrams illustrating different octree structures for volume data in which each node is labeled.
Figure 3B:
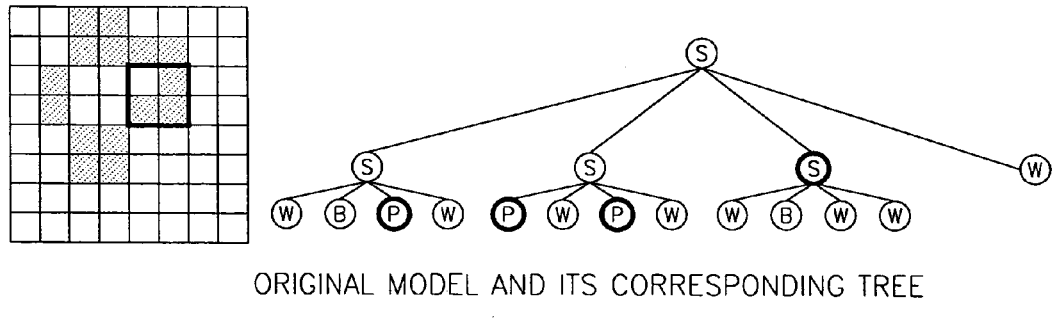

FIGS. 3(a) through 3(d) are diagrams illustrating different octree structures for volume data in which each node is labelled. In FIGS. 3(a) through 3(d), two-dimensional binary images and their respective quadtree representations are illustrated. More specifically, FIG. 3(a) illustrates a parent-children relationship in a quadtree structure, and FIG. 3(b) illustrates a quadtree corresponding to a binary image, in which depth information of the binary image is set to 2. The binary image can be recovered without any data loss by using PPM-encoded data for the quadtree and three P nodes.

Figure 12:
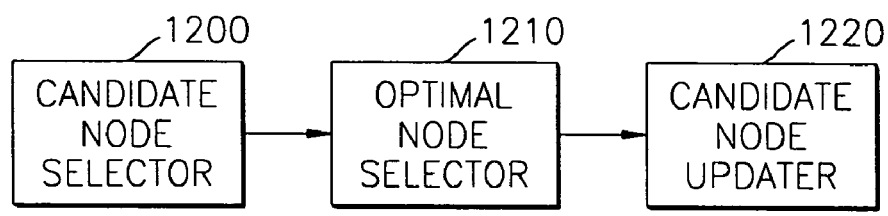
FIG. 12 is a detailed block diagram of a merging order selector of FIG. 11.

FIG. 12 is a detailed block diagram of the merging order selector 1110 of FIG. 11. The merging order selector 1110 merges nodes for three-dimensional object data represented by a tree structure, by referring to labels of the nodes. As shown in FIG. 12, the merging order selector 1110 includes a candidate node selector 1200, an optimal node selector 1210, and a candidate node updater 1220. The candidate node selector 1200 selects a node labelled 'P' and a node labelled 'S' as candidates to be merged. Here, an S node whose children nodes are all white nodes (hereinafter, referred to as 'W' nodes) or black nodes (hereinafter, referred to as 'B' nodes), or 'W' and 'B' nodes can be selected as a candidate to be merged. The optimal node selector 1210 selects, as an optimal node, a node for which a ratio of a difference ΔD between the number of distorted bits before a node merging process and the number of distorted bits after the node merging process with respect to a difference ΔR between the total number of bits before the node merging process and the total number of bits after the node merging process reaches its minimum. Thereafter, the optimal node selector 1210 labels the selected node 'B'. The candidate node updater. 1220 updates all the candidate nodes except for the node selected as an optimal node.

Figure 3C:
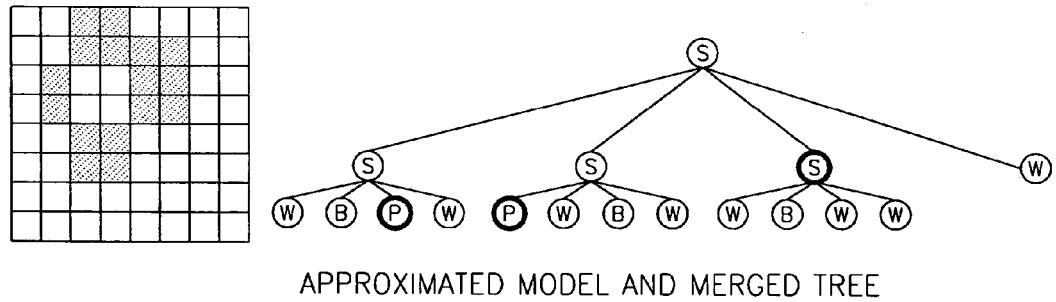
Figure 3D:
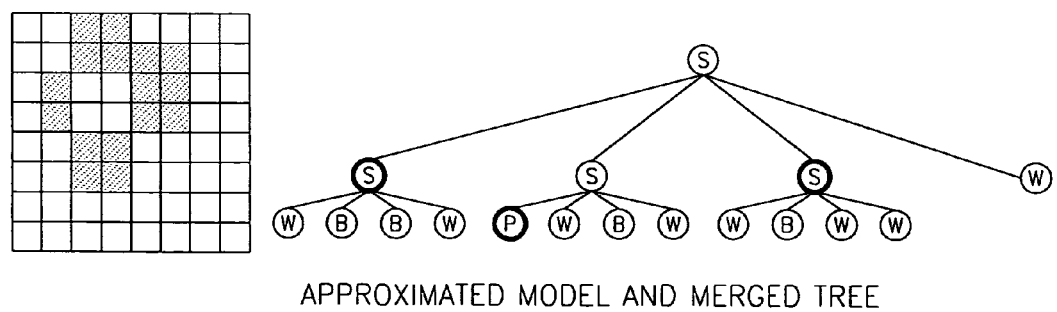

Hereinafter, a tree merging method will be described more fully with reference to FIGS. 3(a) through 3(d), 13, and 14. FIG. 3 illustrates a labelled octree representation and tree merging. Nodes of an initial tree are repeatedly merged to approximate original depth information to a few refinement levels. Here, mergeable nodes are 'P'-labelled nodes or nodes whose children nodes are all B nodes or W nodes. For example, in a tree of FIG. 3(b), there are four mergeable nodes marked by a thicker-lined circle. Let us assume that among the four mergeable nodes, the one corresponding to a region marked by a square on a binary image is merged into a B node. A resulting binary image and a resulting tree are illustrated in FIG. 3(c). Now, as shown in FIG. 3(c), there are three mergeable nodes left. Then, one of the three mergeable nodes (i.e., a P node in the far-left of the tree illustrated in FIG. 3(c)) is merged into a B node. Then, a node which corresponds to an upper left quadrant of the approximated model of FIG. 3(d) and whose children nodes are all 'B' nodes or 'W' nodes becomes mergeable. This tree merging process is continuously carried out until all nodes of the tree are merged together under one root node.

Figure 13:
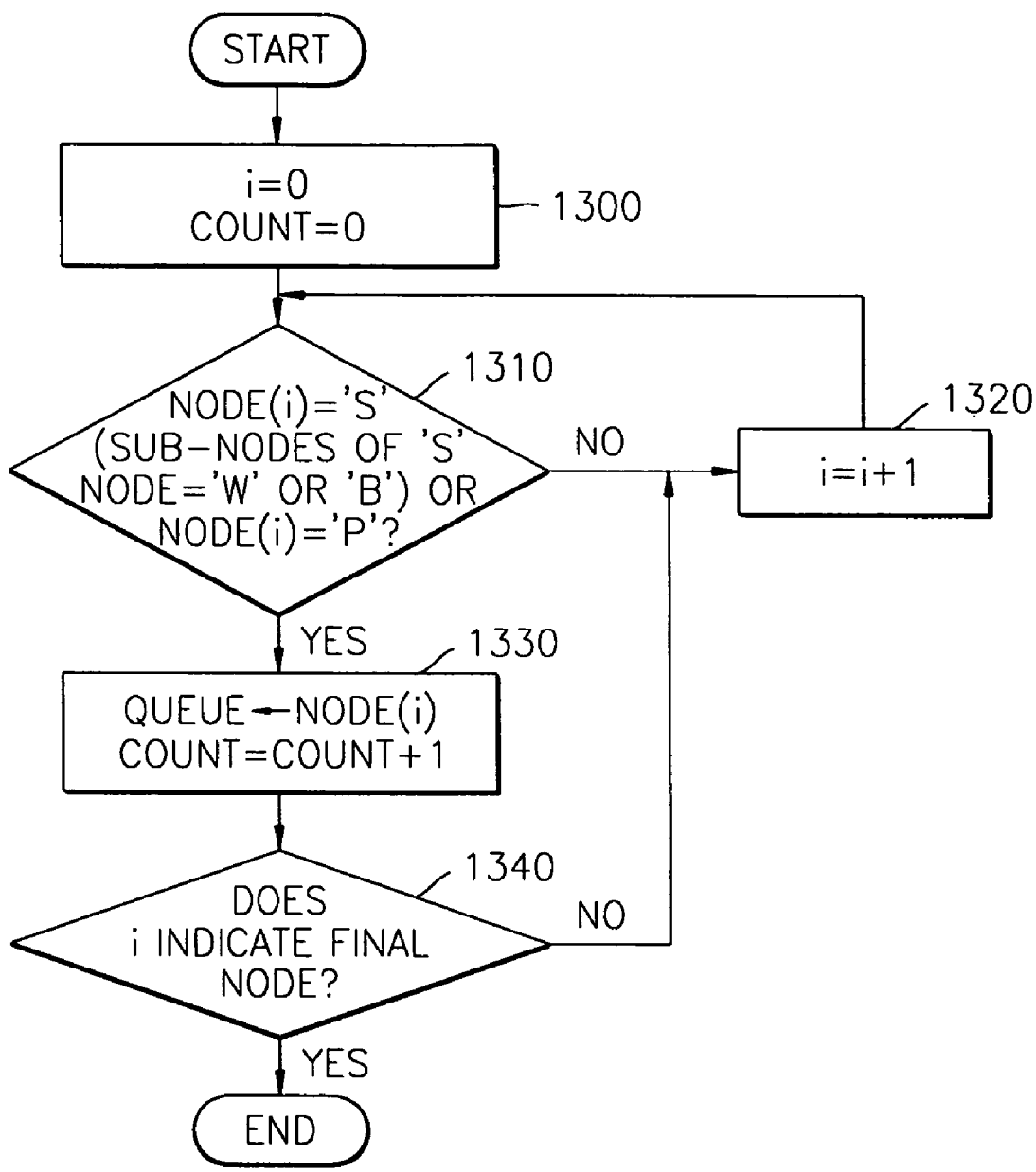
FIG. 13 is a flowchart illustrating the operation of a candidate node selector of FIG. 12.

FIG. 13 is a flowchart illustrating the operation of the candidate node selector 1200. Supposing that 'i' represents a serial number of each node and 'count' represents the number of candidate nodes, 'i' and 'count' are initialised to 0 in step 1300. If a node is labelled 'S' or 'P' in step 1310, it is selected as a candidate node and then is stored in a queue, and 'count' is increased by 1 in step 1330. Here, among 'S' nodes, only the ones whose children nodes are all 'W' nodes or 'B' nodes, or 'W' nodes and 'B' nodes can be selected as candidate nodes. If the node is neither an 'S' node nor a 'P' node, step 1310 is carried out on a next node in step 1320. Steps 1310 through 1330 are repeatedly carried out until 'i' indicates a final node (in step 1340).

Nodes to be merged together are selected from among a set of mergeable nodes, and the ratio of ΔD to ΔR is minimized at a predetermined rate, which is shown in Equation (1) below.

$$-\frac{\Delta D}{\Delta R} = -\frac{D_a - D_b}{R_a - R_b} \quad (1)$$

In Equation (1), ΔR represents a difference between the total number ($R_a$) of bits before a node merging process and the total number ($R_b$) of bits after the node merging process, and ΔD represents a difference between the number ($D_a$) Of distorted bits before the node merging process and the number ($D_b$) of distorted bits after the node merging process. When nodes are merged, a required bit rate decreases, but the degree to which an approximated model is distorted increases. Therefore, it is necessary to search for nodes which can minimize the possibility of the approximated mode being distorted and can maximize a decrease in the required bit rate once they are merged together.

In order to calculate ΔD, a Hamming distance between an original model V and a corresponding approximation is used as distortion measurement.

$$D = \sum_{x=1}^{X} \sum_{y=1}^{Y} \sum_{z=1}^{Z} |V(x, y, z) - \hat{V}(x, y, z)| \quad (2)$$

X×Y×Z represents the resolution of a model.

In order to calculate ΔD, it is necessary to calculate the number of bits required (i.e., a required bit rate) for representing an octree and its PPM nodes. However, it is very complicated to calculate such a required bit rate. Therefore, the required bit rate is calculated by applying typical tree bits and PPM bits to several test models.

Figure 14:
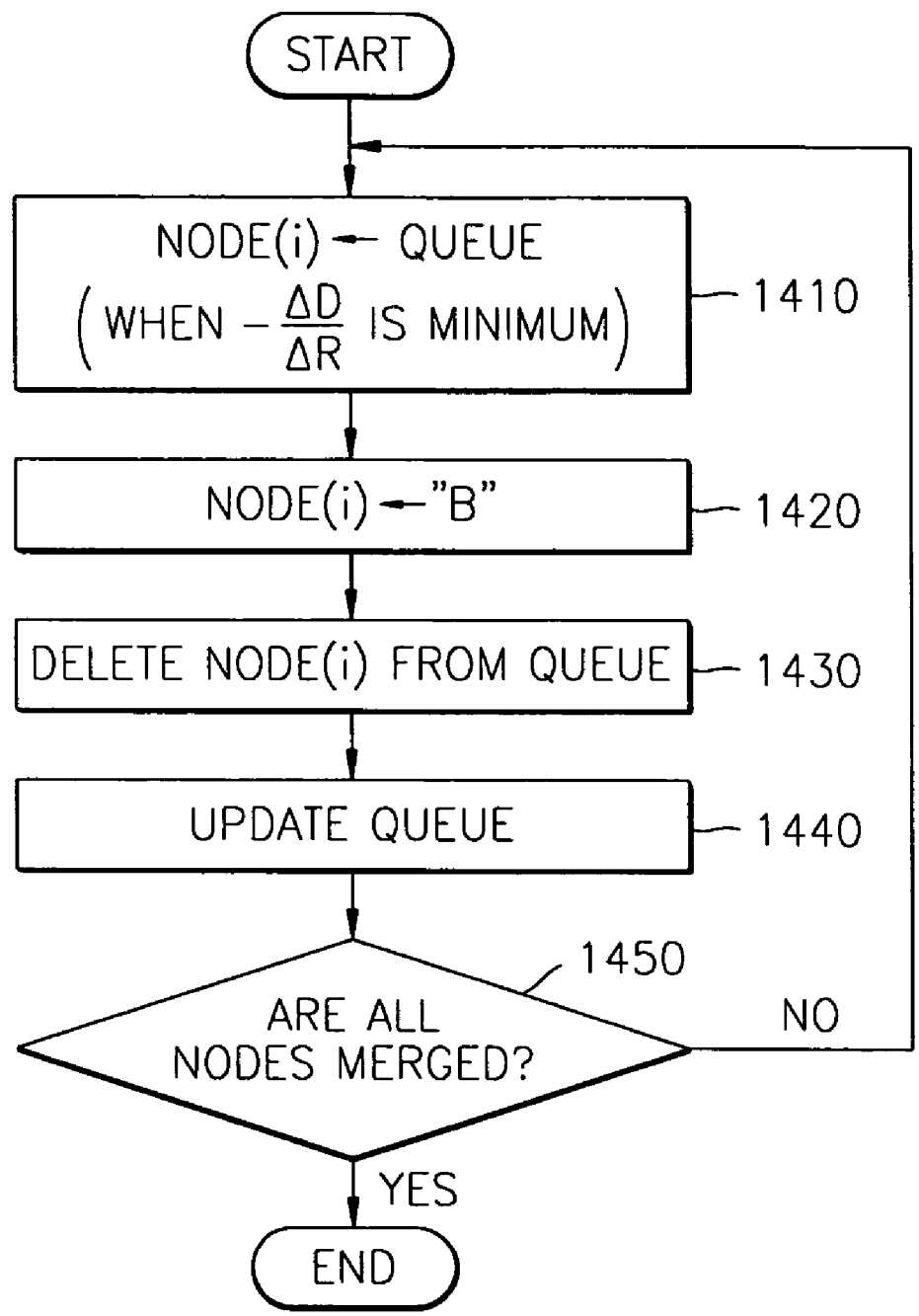
FIG. 14 is a flowchart illustrating the operation of the merging order selector.

FIG. 14 is a flowchart illustrating the operation of the merging order selector 1210. Referring to FIG. 14, a node for which a minimum value can be obtained from Equation (1) is selected as an optimal node from among nodes that are selected by the candidate node selector 1200 as candidate nodes, in step 1410. In step 1420, the selected optimal node is labelled 'B'. In step 1430, the 'B'-labelled node is removed from a queue. In step 1440, the queue is updated. Steps 1410 through 1440 are repeatedly carried out until all nodes are merged together (in step 1450).

Figure 15:
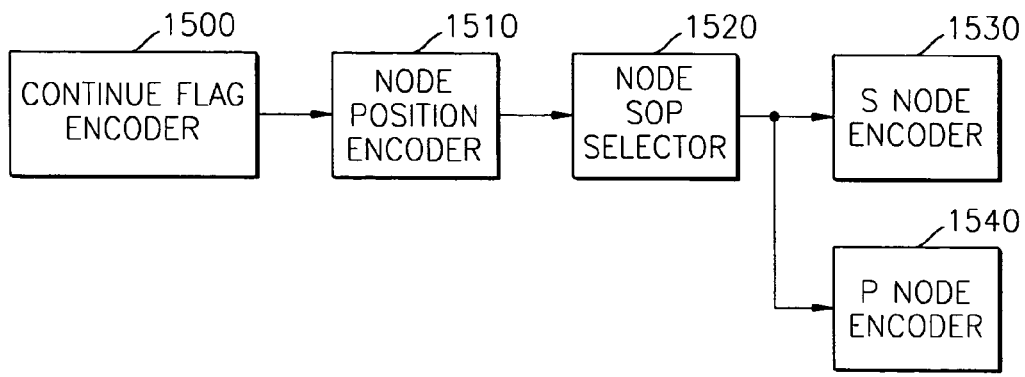
FIG. 15 is a detailed block diagram of a node encoder of FIG. 11.

The node encoder 1120 encodes a merged node. FIG. 15 is a detailed block diagram of the node encoder 1120. Referring to FIG. 15, the node encoder 1120 includes a continue flag encoder 1500, a node position encoder 1510, a node S-or-P (SOP) selector 1520, an S node encoder 1530, and a P node encoder 1540.

The continue flag encoder 1500 encodes a continue flag which indicates whether or not a current node is the end of a compressed bitstream. If the current node is not the end of the compressed bitstream, the continue flag is set as 'true'. Otherwise, the continue flag is set as 'false'. The node position encoder 1510, which includes a candidate node queue in which nodes that are selected by the candidate node selector 1200 as candidate nodes are stored, encodes node position information which indicates the position of each of the candidate nodes in the candidate node queue. The node SOP selector 1520 encodes node type information which indicates whether the current node is an S node or a P node. The S node encoder 1530 encodes detailed information bit (DIB) data of a P node if the node type information indicates that the current node is a P node.

Figure 16:
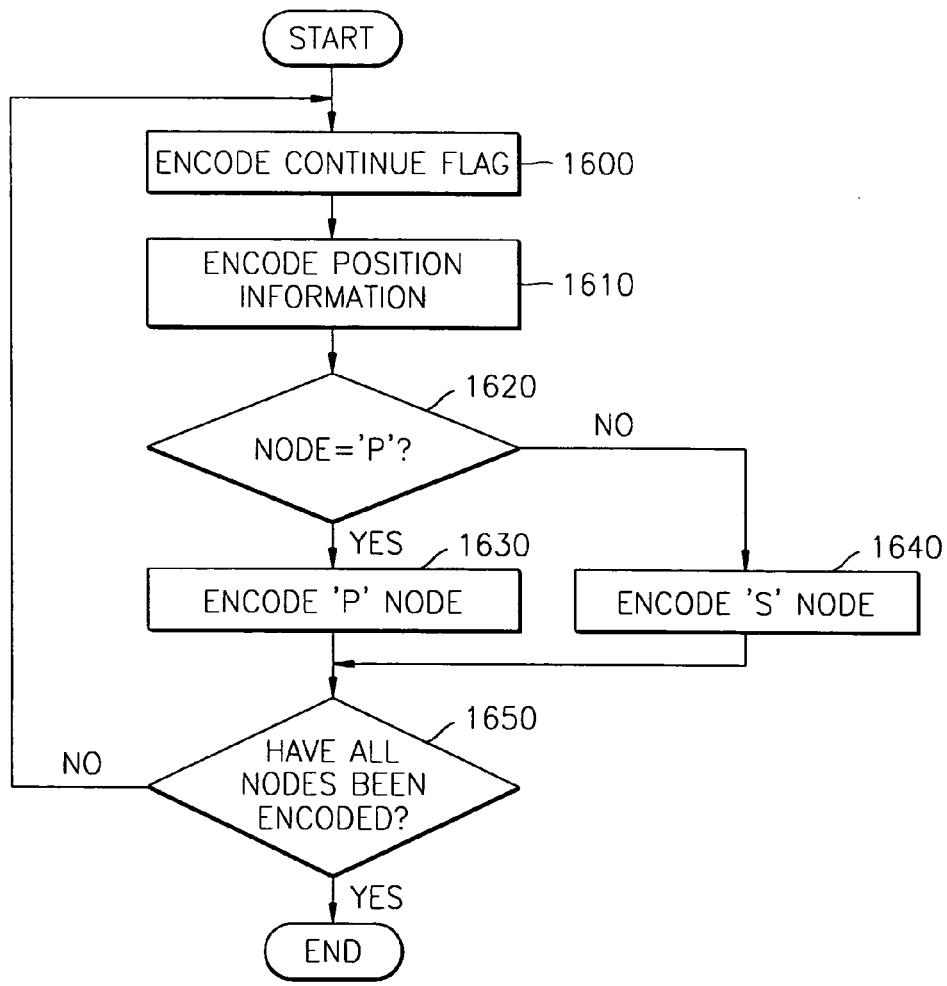
FIG. 16 is a flowchart illustrating the operation of the node encoder.

FIG. 16 is a flowchart illustrating the operation of the node encoder 1120. Referring to FIG. 16, a continue flag is encoded in step 1600. As described above, the continue flag indicates whether or not a current node is the end of a compressed bitstream. If the current node is not the end of the compressed bitstream, the continue flag is set as 'true'. Otherwise, the continue flag is set as 'false'. In step 1610, node position information is encoded. In step 1620, it is checked whether or not the merged node is a P node. If the merged node is a P node, P-node encoding is carried out in step 1630. Otherwise, S-node encoding is carried out. Steps 1600 through 1640 are repeatedly carried out until all nodes are encoded (in step 1650).

Figure 17:
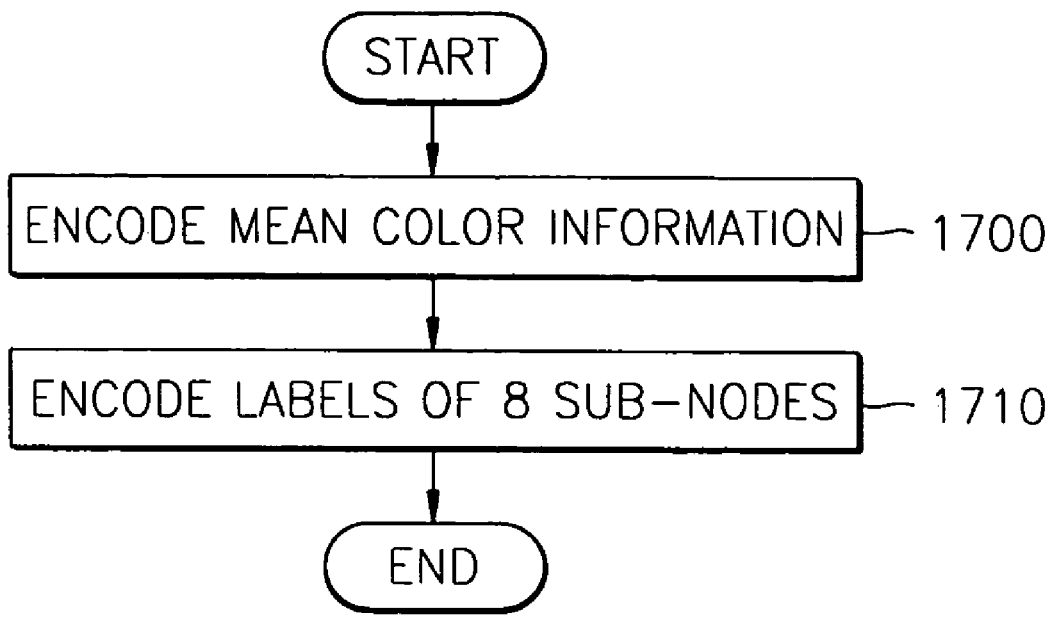
FIG. 17 is a flowchart illustrating the operation of an S node encoder of FIG. 15.

FIG. 17 is a flowchart illustrating the operation of the S node encoder 1520. Referring to FIG. 17, average color information is encoded in step 1700. In step 1710, labels of eight sub-nodes are encoded.

Figure 18:
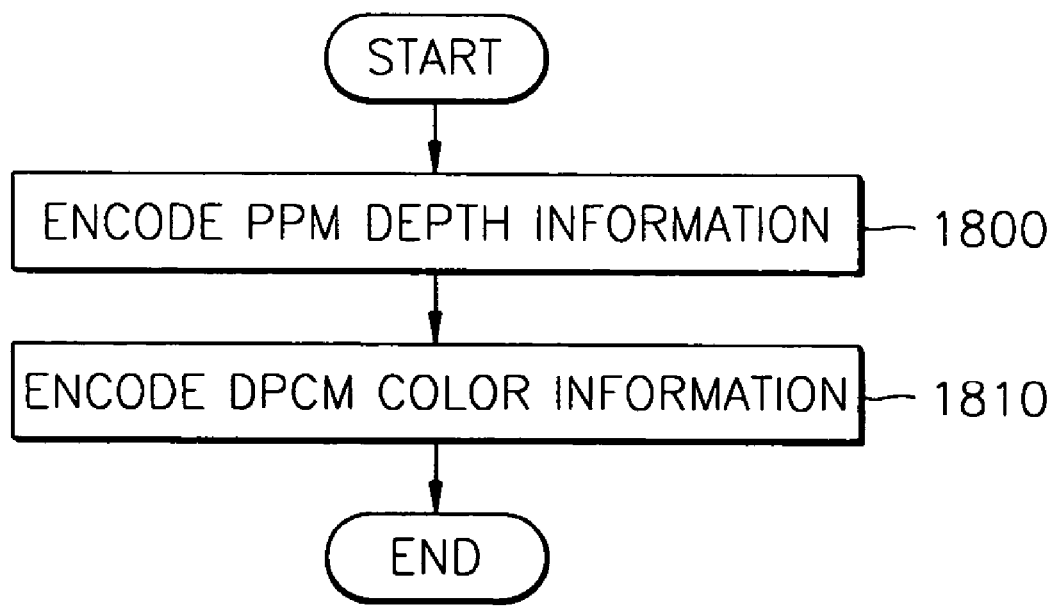
FIG. 18 is a flowchart illustrating the operation of a P node encoder of FIG. 15.

FIG. 18 is a flowchart illustrating the operation of the P node encoder 1530. Referring to FIG. 18, depth information is PPM-encoded in step 1800. In step 1810, color information is differential pulse code modulation (DPCM)-encoded.

More specifically, nodes are merged in a predetermined order according to their priority levels determined using Equation (1), while bitstreams are encoded in the opposite order. In other words, a later-merged node is encoded ahead of an earlier-merged node. Therefore, a decoder may restore three-dimensional models ranging from the coarsest one to the most refined one from a compressed bitstream by parsing the compressed bitstream. A bit rate-distortion curve obtained by using the above-mentioned node merging method is illustrated in FIG. 4.

Hereinafter, the structure of a bitstream will be described in greater detail. A compressed bitstream is comprised of node data of an octree. The order of nodes in the compressed bitstream is just the opposite of a node merging order, as described above. FIG. 5 is a diagram illustrating the structure of a compressed bitstream of a predetermined node. Referring to FIG. 5, node information is comprised of a continue flag, position data, SOP data, and DIB data.

The continue flag indicates whether or not the predetermined node is the end of the compressed bitstream. All the data constituting the node information of FIG. 5 is entropy-encoded using an adaptive arithmetic coder (AAC). The position data indicates whether or not a 'B' node is to be split or to be PPM-encoded. For example, let us assume that a decoder restores the approximated model shown in FIG. 3(*d*) using all data that it has received. The octree of FIG. 3(*d*) includes four 'B' nodes, which are candidate nodes to be merged. In order to obtain as much refined a model as the one shown in FIG. 3(*c*), an encoder informs the decoder that among the four 'B' nodes, a second one from the left of the octree should be PPM-encoded. If there are more than one candidate nodes to be merged, as shown in FIG. 3(*d*), in what order each of the candidate nodes, i.e., 'B' nodes, should be PPM-encoded is encoded as position data. If there is only one candidate node ('B' node), the position data is not necessary, and thus there is no need to encode the position data. The SOP data indicates whether the predetermined node should be split into eight children nodes or should be PPM-encoded. If the SOP data indicates that the predetermined node is an 'S' node, the DIB data is comprised of eight flags indicating what an average color of the predetermined node is and whether or not the predetermined node's children nodes are 'W' nodes. Non-'W' nodes are temporarily considered as B nodes and thus are stored in a queue in which 'B' candidate nodes for a next bitstream are recorded. FIG. 6 illustrates the structure of an 'S' node.

If the SOP data indicates that the predetermined node is a 'P' node, depth information of 'B' voxels in the predetermined node is PPM-encoded, and color information of the 'B' voxels is DPCM-encoded. FIG. 7 illustrates the structure of a bitstream of a 'P' node. PPM was originally proposed by Cleary and Witten to compress facsimile data without any data loss.

Figure 8A:
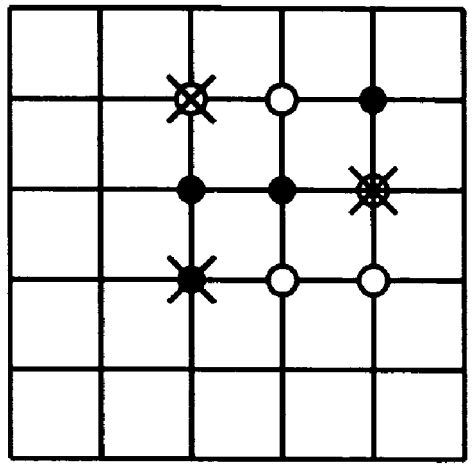
FIGS. 8(a) and 8(b) are diagrams illustrating examples of contexts used in prediction-by-partial-matching (PPM) encoding.
Figure 8B:
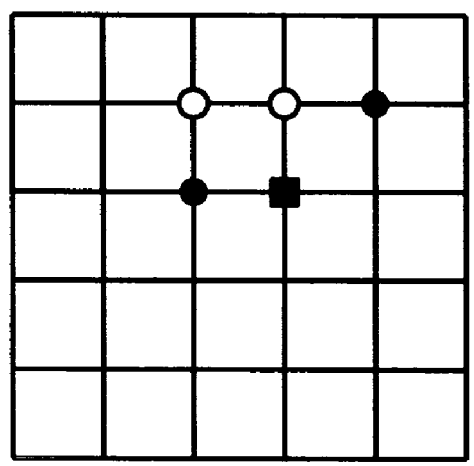

Hereinafter, PPM encoding will be described in greater detail. As described above, depth information is represented by binary voxel values. 'W' voxels represent a transparent background, and 'B' voxels represent a three-dimensional object. Binary voxels in a 'P' node are PPM-encoded by using voxels adjacent to the binary voxels as contexts. FIGS. 8(a) and 8(b) illustrate examples of contexts. Thirteen circular voxels are used as contexts to encode a rectangular voxel. According to raster scanning, 'W' voxels are set to '0', and 'B' voxels are set to '1'. These thirteen bits, i.e., the thirteen circular voxels, are used as contexts for a rectangular voxel shown in FIG. 8(b). In this case, contexts for the rectangular voxel can be represented by '0011101000011', in which case the number of contexts is $2^{13}$. However, $2^{13}$ contexts are too many to compute. Accordingly, there is a need to reduce the number of contexts. Voxels which do not increase entropy considerably even though they are removed away are selected through simulations. Two voxels are removed away first. Thereafter, another voxel is removed away. These three voxels are marked by 'X' in FIG. 8(a). An adaptive arithmetic coder compresses voxels by using this context.

A black square in FIG. 8(b) is encoded, while black circles in FIGS. 8(a) and 8(b) are used as contexts. In FIG. 8(a), the voxels marked by 'X' are the ones that are removed away.

After encoding the depth information, R, G, and B color values of a 'B' voxel in the predetermined node are DPCM-encoded according to a predetermined order defined by raster scanning. More specifically, the R, G, and B color values of the 'B' voxel are estimated based on R, G, and B color values of a previous 'B' voxel. Estimation residuals are encoded using an arithmetic coder.

The bitstream generator 1130 generates node-encoded data into a bitstream.

In the present invention, three-dimensional object data is encoded using a progressive encoding method. However, the three-dimensional object may possibly be encoded using a lossless encoding method or a lossly encoding method. When an entire bitstream is encoded, the way it is encoded could be lossless encoding. On the other hand, when only part of the bitstream ranging from a root node of a tree structure corresponding to the bitstream to a predetermined node in a lower level of the tree structure is encoded, the way it is encoded could be lossly encoding.

Hereinafter, a method and apparatus for decoding three-dimensional object data will be described in greater detail.

Figure 19:
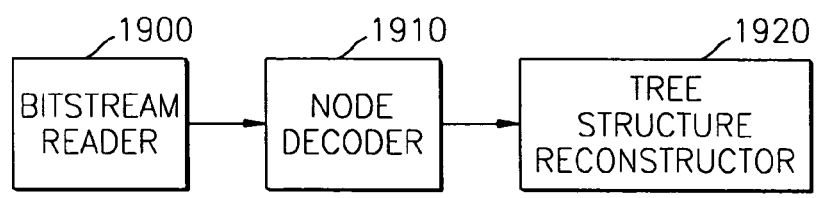
FIG. 19 is a block diagram of an apparatus for decoding three-dimensional object data according to a preferred embodiment of the present invention.

FIG. 19 is a block diagram of an apparatus for decoding three-dimensional object data according to a preferred embodiment of the present invention. Referring to FIG. 19, the apparatus includes a bitstream reader 1900, a node decoder 1910, and a tree structure restorer 1920. The bitstream reader 1900 receives an encoded bitstream of three-dimensional object data, the node decoder 1910 decodes the encoded bitstream, and the tree structure restorer 1920 restores decoded nodes into a tree structure.

Figure 20:
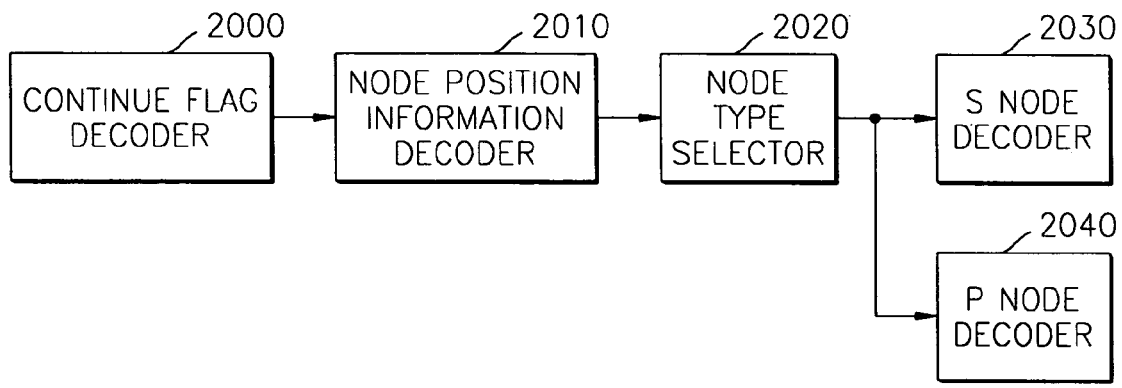
FIG. 20 is a detailed block diagram of a node decoder of FIG. 19.

FIG. 20 is a detailed block diagram of the node decoder 1910. The node decoder 1910 includes a continue flag decoder 2000, a node position information decoder 2010, a node type selector 2020, an S node decoder 2030, and a P node decoder 2040.

The continue flag decoder 2000 reads continue flag information from an encoded bitstream of three-dimensional object data and decodes the encoded bitstream. The node position information decoder 2010 reads node position information of the encoded bitstream and decodes the read node position information into position information indicating where a current node stands in a queue. The node type selector 2020 decodes node type information. If the node type information indicates that the current node is an S node, the S node decoder 2030 decodes an average color of eight sub-nodes as DIB data and then sequentially decodes the eight sub-nodes into 'B' nodes or 'W' nodes. If the node type information indicates that the current node is a PPM node, the P node decoder 2040 PPM-decodes the DIB data of the current node. The P node decoder 2040 decodes R, G, and B colors of 'B' voxels of the current node by carrying out inverse AAC and inverse DPCM.

Figure 21:
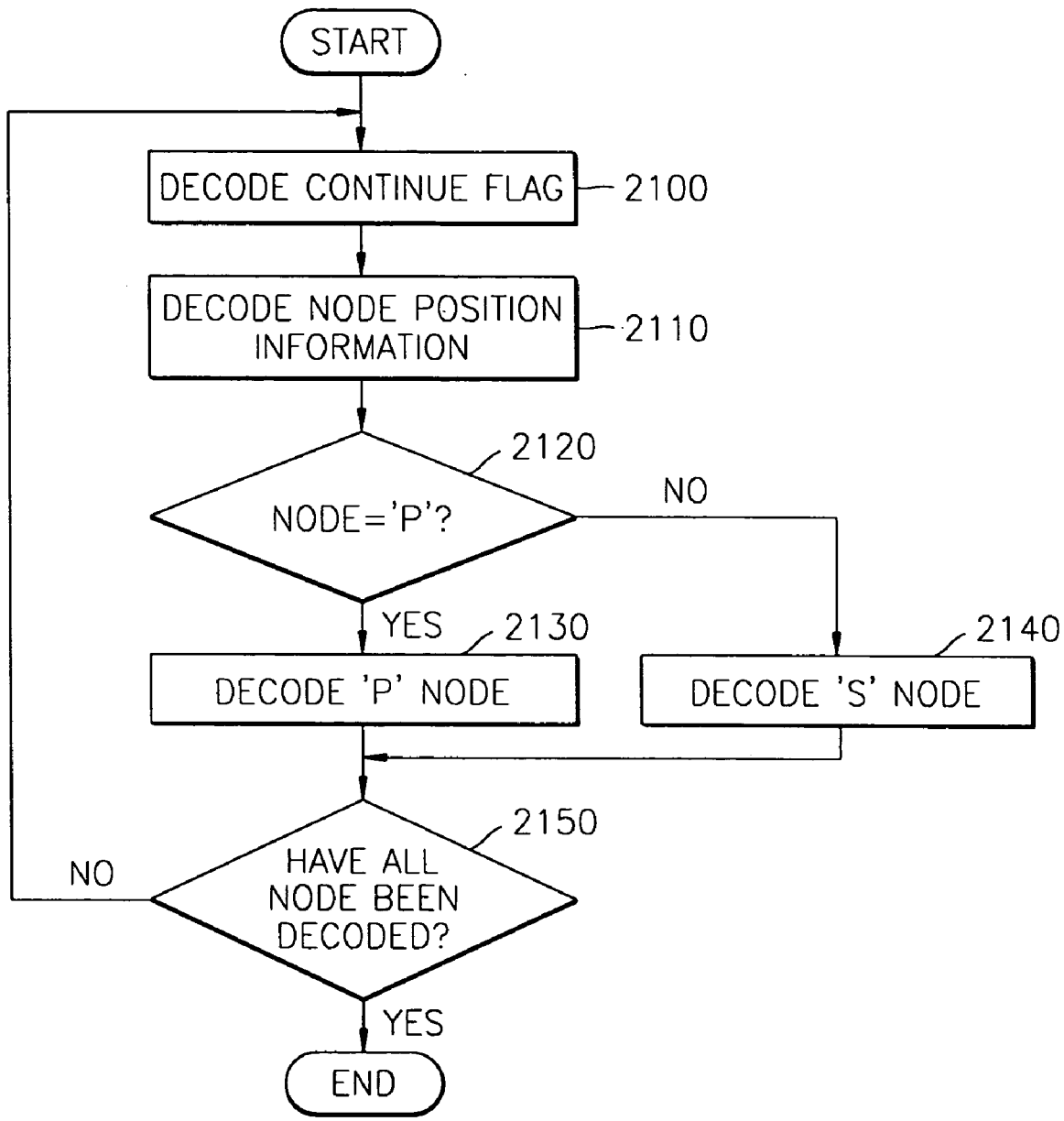
FIG. 21 is a flowchart illustrating the operation of the node decoder.

FIG. 21 is a flowchart illustrating the operation of the node decoder 1910. Referring to FIG. 21, a continue flag is decoded in step 2100. In step 2110, position data is decoded. In step 2120, it is checked whether or not a current node is a 'P' node. If the current node is a 'P' node, the current node is decoded using a 'P' node decoding method in step 2130. Otherwise, the current node is encoded using an 'S' decoding method in step 2140. Steps 2100 through 2130 are repeatedly carried out until all nodes are decoded (in step 2150).

Figure 22:
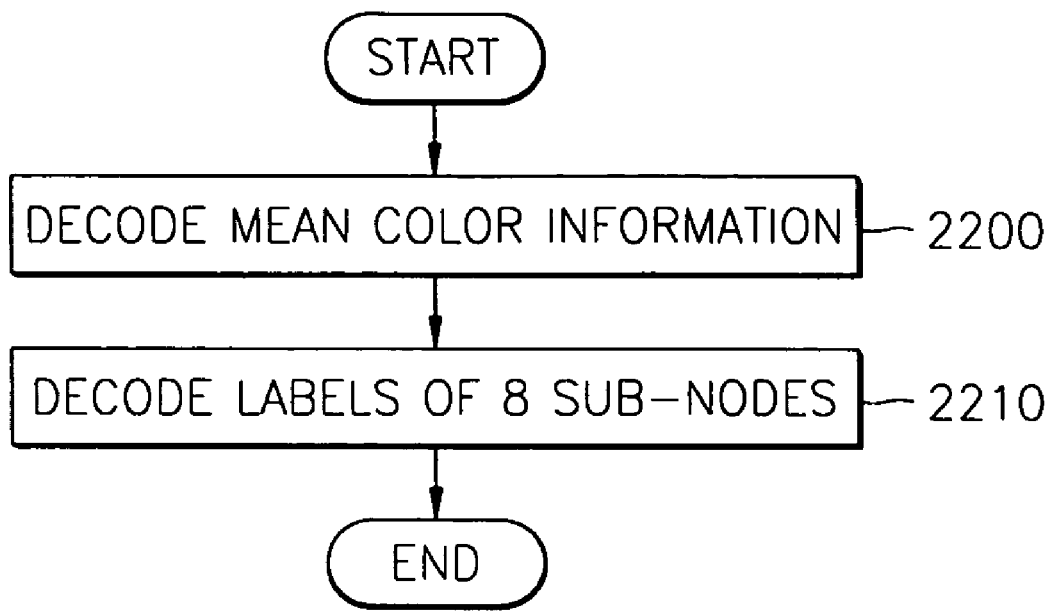
FIG. 22 is a flowchart illustrating the operation of an S node decoder of FIG. 20.

FIG. 22 is a flowchart illustrating the operation of the S node-decoder 2020. Referring to FIG. 22, average color information is decoded in step 2200. In step 2210, labels of eight sub-nodes of a current node are decoded.

Figure 23:
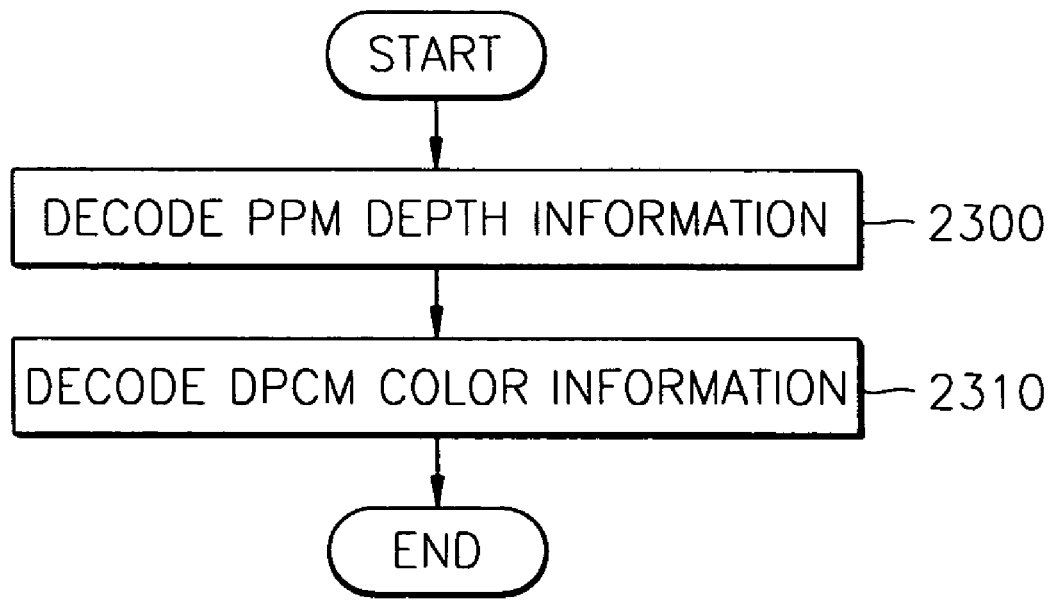
FIG. 23 is a flowchart illustrating the operation of a P node decoder of FIG. 20.

FIG. 23 is a flowchart illustrating the operation of the P node decoder 2030. Referring to FIG. 23, PPM depth information is decoded in step 2300. In step 2310, color information is decoded by carrying out inverse DPCM. More specifically, a current node is PPM-decoded using DIB data, and R, G, and B values of black voxels of the current node are decoded by carrying out inverse AAC and inverse DPCM.

Hereinafter, the method of decoding three-dimensional object data according to the present invention will be described in greater detail. The method of decoding three-dimensional object data according to the present invention is similar to the method of decoding three-dimensional object data according to the present invention. A decoder reads a continue flag of a bitstream and checks whether or not a current node is the end of the bitstream. Then, the decoder reads position data and SOP data and determines which nodes should be split or PPM-decoded based on the read position data and SOP data. If the current node is an 'S' node, color values of all voxels of the current node are temporarily set to an average of R, G, and B color values in DIB data. The color values of the voxels of the current node are updated when data of the current node's children nodes is received. If the current node is a 'P' node, depth and color information of 'B' voxels of the current node are losslessly restored using the DIB data.

In the present invention, three-dimensional object data is decoded in a progressive manner. In the progressive manner, nodes are decoded in a predetermined order in which bitstreams of image data are decoded. Therefore, if image data is displayed on a screen, decoded nodes are sequentially displayed on the screen in an order from an uppermost node to a lowermost node. Accordingly, as a decoding process reaches lower nodes in a tree structure representing three-dimensional object data, an image displayed on the screen becomes more refined and clearer. When the decoding process is over after decoding a final node, a most refined and clearest image is displayed on the screen.

As described above, in the present invention, three-dimensional object data is decoded in a progressive manner. However, the three-dimensional object may possibly be decoded using a lossless decoding method or a lossly decoding method. When an entire-bitstream is decoded, the way it is decoded could be lossless decoding. On the other hand, when only part of the bitstream ranging from a root node of a tree structure corresponding to the bitstream to a predetermined node in a lower level of the tree structure is decoded, the way it is decoded could be lossly decoding.

The performance of the methods of encoding and decoding three-dimensional object data according to the present invention was evaluated using test models illustrated in FIGS. 9(a) through 9(h). The test models shown in FIGS. 9(a) through 9(e) have a resolution of 256×256×256, and the test models shown in FIGS. 9(f) through 9(h) have a resolution of 512×512×512.

FIGS. 10(a) and 10(b) are tables illustrating the data compression performance of the present invention with that of WinZip. The present invention only requires 22~59% of a file size that WinZip requires for processing depth information. The present invention only requires 59~81% of a file size that WinZip requires for processing color information. However, in terms of processing a 'plane' model, WinZip shows better performance than the present invention because the 'plane' model only contains several colors and WinZip, which is a dictionary-based coder, is more suitable for dealing with the 'plane' model. The present invention only requires 49~75% of a file size that WinZip requires for compressing depth information and color information.

The present invention supports progressive data transmission and progressive data decoding that WinZip does not, which is noteworthy. Progressive data transmission and progressive data decoding are preferable because they facilitate adaptation of bitstreams to a bandwidth-limited environment and browsing of three-dimensional models.

The present invention suggests a progressive data compression method for PointTexture. In the progressive data compression method, pixels are closely related to one another in terms of color vectors and depth information. In the present invention, depth information and color information can be effectively encoded by applying a PPM method to an octree structure. Many simulation results show that the present invention provides a higher compression rate than a universal Lempel-Ziv coder, i.e., WinZip, does.

The present invention can be realized as computer-readable codes written on a computer-readable recording medium. The computer-readable recording medium includes all types of recording devices on which data can be recorded in a computer-readable manner. For example, the computer-readable recording medium includes ROM, RAM, CD-ROM, a magnetic tape, a floppy disk, an optical data storage, and a carrier wave, such as data transmission through the Internet. The computer-readable recording medium can be distributed over a plurality of computer systems that are connected to one another in a network sort of way, in which case data can be stored in the computer-readable recording medium in a decentralized manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding three-dimensional object data, which is comprised of point texture data, voxel data, or octree structure data, the method comprising:

generating three-dimensional object data using a three-dimensional bounding volume to convert the three-dimensional object data into voxel data, wherein the voxels are differentiated based on whether they are located where objects exist or in a background;

representing the voxel data by a tree structure of a predetermined depth in which nodes include attached labels indicating their respective types, the types comprising nodes having sub-nodes, nodes having all voxels located in the background, nodes having all voxels located where objects exist, and nodes at the predetermined depth having voxels located where objects exist and in the background, wherein the nodes at the predetermined depth having voxels located where objects exist and in the background do not have sub-nodes;

encoding nodes of the three-dimensional object data; and generating the three-dimensional object data whose nodes are encoded into a bitstream; and transmitting the encoded bitstream to a decoder.

2. The method of claim 1, wherein in the tree structure representing the three-dimensional object data, a node having sub-nodes is labeled 'S', a node whose voxels are all located in the background is labeled 'W' a node whose voxels are all located where objects exist is labeled 'B', and a node at the predetermined depth whose voxels are located where objects exist and in the background is labeled 'P', wherein 'P' nodes are encoded using a prediction-by-partial-matching (PPM) algorithm.

3. The method of claim 2, wherein encoding the nodes of the three-dimensional object data comprises:

encoding node information which indicates whether or not a current node is an 'S' node or a 'P' node; and encoding detailed information bit (DIB) data of an 'S' node if the node information indicates that the current node is an 'S' node and encoding DIB data of a 'P' node if the node information indicates that the current node is a 'P' node.

4. The method of claim 1, wherein in encoding the nodes of the three-dimensional object data, only some of the nodes of the three-dimensional object data, ranging from a root node to a predetermined lower node, are encoded.

5. The method of claim 1, wherein in encoding the nodes of the three-dimensional object data, all the nodes of the three-dimensional object data are encoded.

6. A method of encoding three-dimensional object data, which is comprised of point texture data, voxel data, or octree structure data, the method comprising:

(a) generating three-dimensional object data having a tree structure of a predetermined depth in which nodes include attached labels indicating their respective types, the types comprising nodes having sub-nodes, nodes having all voxels located in a background, nodes having all voxels located where objects exist, and nodes at the predetermined depth having voxels located where objects exist and in the background, wherein the nodes at the predetermined death having voxels located where objects exist and in the background do not have sub-nodes;

(b) merging the nodes of the three-dimensional object data by referring to their labels;

(c) encoding merged nodes;

(d) generating the three-dimensional object data whose merged nodes are encoded into a bitstream; and (e) repeatedly carrying out steps (a) through (d) until an uppermost node of the tree structure representing the three-dimensional object data is encoded; and (f)

transmitting the encoded three-dimensional object data to a decoder.

7. The method of claim 6, wherein in step (a), a node having sub-nodes is labeled 'S', a node whose voxels are all located in the background is labeled 'W', a node whose voxels are all located where objects exist is labeled 'B', and a node at the predetermined depth whose voxels are located where objects exist and in the background is labeled 'P', wherein 'P' nodes are encoded using a prediction-by-partial-matching (PPM) algorithm.

8. The method of claim 7, wherein step (b) comprises:

selecting 'P' nodes and 'S' nodes whose sub-nodes are labeled 'W' and 'B' as candidate nodes to be merged;

selecting, from among the candidate nodes as an optimal node, a node which can minimize a ratio of a difference $\Delta D$ between a number of distorted bits before merging the candidate nodes and a number of distorted bits after merging the candidate nodes with respect to a difference $\Delta R$ between a number of bits before merging the candidate bits and a number of bits after merging the candidate bits;

labeling the selected node 'B'; and updating all the candidate nodes except the node selected as an optimal node.

9. The method of claim 8, wherein D is calculated in the following equation using a Hamming distance between an original model V and its approximation $\hat{V}$ as distortion measurement:

$$D = \sum_{x=1}^{X} \sum_{y=1}^{Y} \sum_{z=1}^{Z} |V(x, y, z) - \hat{V}(x, y, z)|$$

where X×Y×Z represents the resolution of the original model.

10. The method of claim 8, wherein step (c) comprises:

encoding a continue flag which includes information indicating whether or not the candidate nodes exist in a queue;

encoding node position information which indicates a position of each of the candidate nodes in the queue;

encoding node type information which indicates whether or not a current node is an 'S' node or a 'P' node; and encoding detailed information bit (DIB) data of an 'S' node if the node type information indicates that the current node is an 'S' node and encoding DIB data of a 'P' node if the node type information indicates that the current node is a 'P' node.

11. The method of claim 10, wherein encoding the DIB data of the 'S' node comprises:

encoding an average of color information; and encoding labels of eight sub-nodes of the current node.

12. The method of claim 10, wherein encoding the DIB data of the 'P' node comprises:

encoding depth information; and encoding color information.

13. The method of claim 12, wherein in encoding the depth information, all nodes below a predetermined node in the tree structure representing the three-dimensional object data are PPM-encoded according to a raster scanning order by using a predetermined number of contexts.

14. The method of claim 12, wherein in encoding the color information, red (R), green (G), and blue (B) values of 'B' voxels of the current node are encoded by carrying out differential pulse code modulation (DPCM) and adaptive arithmetic coding (AAC).

15. The method of claim 6, wherein in step (c), only some of the merged nodes, ranging from a first merged node to a predetermined numbered merged node, are encoded.

16. The method of claim 6, wherein in step (c), all the merged nodes are encoded.

17. An apparatus for encoding three-dimensional object data, which is comprised of point texture data, voxel data, or octree structure data, the apparatus comprising:

a tree structure generator which generates three-dimensional object data having a tree structure of a predetermined depth in which nodes include attached labels indicating their respective types, the types comprising nodes having sub-nodes, nodes having all voxels located in a background, nodes having all voxels located where objects exist, and nodes at the predetermined depth having voxels located where objects exist and in the background, wherein the nodes at the predetermined depth having voxels located where objects exist and in the background do not have sub-nodes;

a merging order selector which merges the nodes of the three-dimensional object data by referring to their labels;

a node encoder which encodes merged nodes; and a bitstream generator which generates the three-dimensional object data whose merged nodes are encoded into a bitstream.

18. The apparatus of claim 17, wherein the merging order selector comprises:

a candidate node selector which selects 'P' nodes and 'S' nodes whose sub-nodes are labeled 'W' and 'B' as candidate nodes to be merged, wherein the 'P' nodes include the nodes at the predetermined depth having voxels located where objects exist and in the background, the 'S' nodes include the nodes having sub-nodes, the 'W' nodes include the nodes having all voxels located in the background, and the 'B' nodes include the nodes having all voxels located where objects exist;

an optimal node selector which selects, from among the candidate nodes as an optimal node, a node which can minimize a ratio of a difference $\Delta D$ between a number of distorted bits before merging the candidate nodes and a number of distorted bits after merging the candidate nodes with respect to a difference $\Delta R$ between a number of bits before merging the candidate bits and a number of bits after merging the candidate bits and labels the selected node 'B'; and a candidate node updater which updates all the candidate nodes except the node selected as an optimal node.

19. The apparatus of claim 18, wherein the node encoder comprises:
- a continue flag encoder which encodes a continue flag which includes information indicating whether or not a current node is an end of a compressed bitstream;
- a node position encoder which encodes node position information indicating a position of each of the candidate nodes in a queue;
- a node 'S'-or-'P' (SOP) selector which encodes node type information indicating whether or not the current node is an 'S' node or a 'P' node
- an S node encoder which encodes detailed information bit (DIB) data of an 'S' node if the node type information indicates that the current node is an 'S' node; and
- a P node encoder which encodes DIB data of a 'P' node if the node type information indicates that the current node is a 'P' node.

20. The apparatus of claim 17, wherein the node encoder encodes only some of the merged nodes, ranging from a first merged node to a predetermined numbered merged node, are encoded.

21. The apparatus of claim 17, wherein the node encoder encodes all the merged nodes.

22. A method of decoding three-dimensional object data, comprising:
- reading continue flag information from a bitstream of encoded three-dimensional object data and decoding the continue flag information;
- decoding node type information of the bitstream, comprising:
  - decoding an 'S' node if the node type information indicates that a current node is a node having sub-nodes, and
  - decoding a 'P' node if the node type information indicates that the current node is a node at a predetermined depth of a tree structure having voxels located where objects exist and in a background and that the current node does not have sub-nodes;
- restoring the three-dimensional object data whose nodes are encoded to the tree structure; and displaying the decoded three-dimensional object data.

23. A method of decoding three-dimensional object data, comprising:
- decoding nodes of a bitstream of encoded three-dimensional object data, comprising decoding node type information of the bitstream, wherein the node type information describes nodes having sub-nodes and nodes at a predetermined depth of a tree structure having voxels located where objects exist and in a background, wherein the nodes at the predetermined depth of the tree structure having voxels located where objects exist and in the background do not have sub-nodes; restoring the three-dimensional object data whose nodes are encoded to the tree structure; and displaying the decoded three-dimensional object data.

24. The method of claim 23, wherein decoding the nodes of the bitstream of the encoded three-dimensional object data further comprises:
- reading continue flag information from a bitstream of encoded three-dimensional object data and decoding the continue flag information; and
- reading node position information indicating which candidate node in a queue is a current node and decoding the node position information;
- and wherein decoding node type information of the bitstream comprises:
  - decoding an 'S' node if the node type information indicates that a current node is a node having sub-nodes; and
  - decoding a 'P' node according to a prediction-by-partial-matching (PPM) algorithm if the node type information indicates that the current node is a node at the predetermined depth of the tree structure having voxels located where objects exist and in the background.

25. The method of claim 24, wherein in decoding the 'S' node, an average color of eight sub-nodes of the current node is decoded as detailed information bit (DIB) data, and the eight sub-nodes are sequentially decoded into nodes having all voxels located where objects exist ('B' nodes) or nodes having all voxels located in the background ('W' nodes).

26. The method of claim 25, wherein in decoding the 'P' node, the current node is PPM-decoded using DIB data bits, and red (R), green (G), and blue (B) values of 'B' voxels of the current node are decoded by carrying out inverse adaptive arithmetic coding (AAC) and inverse differential pulse code modulation (DPCM).

27. An apparatus for decoding a bitstream of encoded three-dimensional object data, the apparatus comprising:
- a bitstream reader which receives a bitstream of encoded three-dimensional object data;
- a node decoder which decodes the bitstream, the node decoder comprising a node type selector which decodes node type information of the bitstream, wherein the node type information describes nodes having sub-nodes and nodes at a predetermined depth of a tree structure having voxels located where objects exist and in a background, wherein the nodes at the Dredetermined death of the tree structure having voxels located where obiects exist and in the background do not have sub-nodes; and
- a tree structure restorer which restores decoded nodes to the tree structure.

28. The apparatus for claim 27, wherein the node decoder further comprises:
- a continue flag decoder which decodes a continue flag indicating whether or not a current node is an end of the bitstream;
- a node position information decoder which reads node position information indicating which candidate node in a queue is a current node and decodes the node position information;
- and wherein the node type selector comprises:
- an S node decoder which decodes an average color of eight sub-nodes of the current node as detailed information bit (DIB) data and then sequentially decodes the eight sub-nodes into nodes having all voxels located where objects exist ('B' nodes) or nodes having all voxels located in the background ('W' nodes), if the node type information indicates that the current node is a node having sub-nodes ('S' node); and
- a P node decoder which prediction-by-partial-matching (PPM)-decodes DIB data of the current node and then decodes red (R), green (G), and blue (B) values of 'B' voxels of the current node by carrying out inverse adaptive arithmetic coding (AAC) and inverse differential pulse code modulation (DPCM) decoding, if the node type information indicates that the current node is a node at the predetermined depth of the tree structure having voxels located where objects exist and in a background ('P' node).

29. A computer-readable recording medium encoded with a computer program having instructions for processing the method of claim 1.

30. A computer-readable recording medium encoded with a computer program having instructions for processing the method of claim 6.

31. A computer-readable recording medium encoded with a computer program having instructions for processing the method of claim 22.

32. A computer-readable recording medium encoded with a computer program having instructions for processing the method of claim 23.

* * * * *